United States Patent
Ren et al.

(10) Patent No.: US 12,108,343 B2
(45) Date of Patent: Oct. 1, 2024

(54) TRANSMITTING POWER DETERMINATION METHOD, APPARATUS AND COMMUNICATION DEVICE

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 458 days.

(21) Appl. No.: 17/607,006

(22) PCT Filed: Apr. 8, 2020

(86) PCT No.: PCT/CN2020/083807
§ 371 (c)(1),
(2) Date: Oct. 27, 2021

(87) PCT Pub. No.: WO2020/220955
PCT Pub. Date: Nov. 5, 2020

(65) Prior Publication Data
US 2022/0210744 A1    Jun. 30, 2022

(30) Foreign Application Priority Data
Apr. 28, 2019  (CN) .......................... 201910349767.8

(51) Int. Cl.
*H04W 52/14*    (2009.01)
*H04W 52/24*    (2009.01)
(Continued)

(52) U.S. Cl.
CPC ....... *H04W 52/146* (2013.01); *H04W 52/242* (2013.01); *H04W 52/367* (2013.01); *H04W 92/18* (2013.01)

(58) Field of Classification Search
CPC ............. H04W 52/146; H04W 52/242; H04W 52/367
See application file for complete search history.

(56) References Cited

U.S. PATENT DOCUMENTS

2013/0196606 A1  8/2013  Brown et al.
2014/0169322 A1  6/2014  Ouchi et al.
(Continued)

FOREIGN PATENT DOCUMENTS

CN  102056218 A  5/2011
CN  103718623 A  4/2014
(Continued)

OTHER PUBLICATIONS

International Search Report for PCT Application PCT/CN2020/083807, issued Jun. 10, 2020 and its English Translation.
(Continued)

*Primary Examiner* — Justin Y Lee
(74) *Attorney, Agent, or Firm* — Ladas & Parry, LLP

(57) ABSTRACT

This disclosure provides a transmitting power determination method and apparatus, and a communication device. The transmitting power determination method includes: determining a comprehensive path loss according to a sidelink path loss of a first device, an uplink path loss of the first device, a first adjustment factor corresponding to the sidelink path loss and a second adjustment factor corresponding to the uplink path loss; determining transmitting power of the first device according to a third adjustment factor and the comprehensive path loss.

17 Claims, 3 Drawing Sheets

(51) Int. Cl.
 *H04W 52/36* (2009.01)
 *H04W 92/18* (2009.01)

(56) References Cited

U.S. PATENT DOCUMENTS

| | | |
|---|---|---|
| 2016/0057709 A1 | 2/2016 | Gao et al. |
| 2018/0007606 A1 | 1/2018 | Lee et al. |
| 2020/0154373 A1 | 5/2020 | Lu et al. |
| 2020/0228247 A1* | 7/2020 | Guo .................. H04W 52/383 |

FOREIGN PATENT DOCUMENTS

| | | |
|---|---|---|
| CN | 104094646 A | 10/2014 |
| CN | 105813186 A | 7/2016 |
| WO | 2019011089 A1 | 1/2019 |
| WO | 2020126114 A1 | 6/2020 |

OTHER PUBLICATIONS

Written Opinion for PCT Application PCT/CN2020/083807, issued Jun. 10, 2020 and its English Translation.
First Office Action for Chinese Patent Application 201910349767.8, issued Mar. 17, 2021 and its English Translation.
"Sidelink physical layer procedures for NR V2X" 3GPP TSG WG1 Meeting #96bis R1-1903944 Xi'an, China, Apr. 8-12, 2019 Agenda Item: 7.2.4.5 Source: Huawei, HiSilicon.
"Discussion on physical layer procedures for NR sidelink" 3GPP TSG RAN WG1 #96bis R1-1904579 Xi'an, China, Apr. 8-12, 2019 Agenda Item: 7.2.4.5 Source: Lenovo, Motorola Mobility.
"Power control and power sharing for V2X sidelink" 3GPP TSG RAN WG1 Meeting #96bis R1-1904691 Xi'an, China, Apr. 8-12, 2019 Agenda Item: 7.2.4.8 Source: Huawei, HiSilicon.
Extended European Search Report for European Application No. 20799371.8 issued on May 20, 2022.

\* cited by examiner

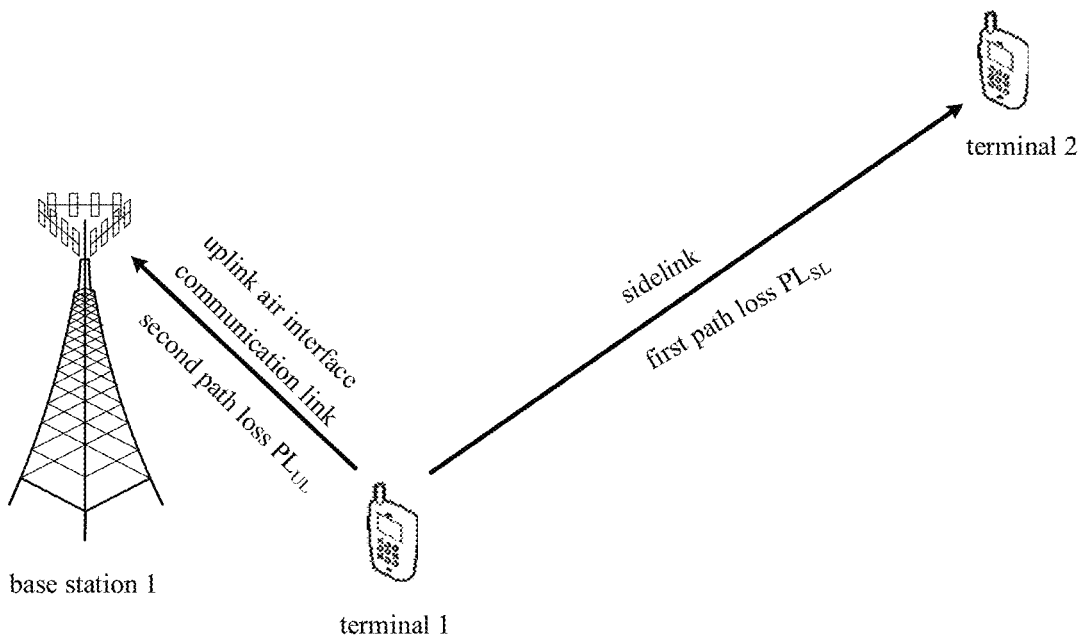

FIG. 1

```
determining a comprehensive path loss according to a sidelink
path loss of a first device, an uplink path loss of the first device,
a first adjustment factor corresponding to the sidelink path loss
and a second adjustment factor corresponding to the uplink path
                              loss
```
/ 21

```
determining transmission power of the first device according to
   a third adjustment factor and the comprehensive path loss
```
/ 22

FIG. 2

TRANSMITTING POWER DETERMINATION METHOD, APPARATUS AND COMMUNICATION DEVICE

CROSS-REFERENCE TO RELATED APPLICATIONS

This application is a U.S. national phase application of a PCT Application No. PCT/CN2020/083807 filed on Apr. 8, 2020, which claims a priority to Chinese patent application No. 201910349767.8 filed in China on Apr. 28, 2019, the disclosures of which are incorporated herein by reference in their entireties.

TECHNICAL FIELD

The present disclosure relates to the field of communication technology, in particular to a transmitting power determination method and apparatus and a communication device.

BACKGROUND

In New Radio (NR) vehicle-to-everything (V2X) in the related art, when a terminal is performing sidelink communication, in order to ensure the communication quality of the sidelink of the terminal and reduce the interference to the uplink air interface communication link, transmitting power of the terminal cannot be too small or too large, which requires control of the transmitting power of the terminal. A commonly used power control scheme is a method for partially compensating for the path loss. A conventional technical solution determines the sidelink communication transmitting power by using a minimum value of the sidelink path loss and the uplink air interface communication link path loss as a comprehensive path loss and then performing partial compensation based on the comprehensive path loss. As shown in FIG. 1, a schematic diagram of the sidelink and the uplink air interface communication link of the terminal is illustrated. As shown in the figure, when determining transmitting power, the terminal 1 needs to perform path loss compensation according to the comprehensive path loss. The comprehensive path loss is the minimum value of a first path loss $PL_{SL}$ (sidelink path loss) and a second path loss $PL_{UL}$ (uplink path loss).

In the shared carrier scenario, when the information to be transmitted via a sidelink is important, it is necessary to ensure high reliability and low latency of information transmission. However, in the case that a sidelink transmitting user equipment (UE) is far away from a sidelink receiving UE ($PL_{SL}$ is relatively large), and the sidelink transmitting UE is closer to a base station ($PL_{UL}$ is relatively small), if the scheme in the related art is adopted, path loss compensation can only be performed based on the relatively small $PL_{UL}$. As a result, the sidelink data transmission block error ratio (BLER) is high due to insufficient transmitting power.

That is, if the transmitting terminal is very close to the base station, leading to a small path loss of the uplink air interface communication link, and if the transmitting terminal is far away from the sidelink receiving terminal, adoption of the scheme in the related art will render the transmitting power of the terminal very low, which leads to a substantial degradation of sidelink communication quality and a decrease in sidelink communication throughput.

SUMMARY

The purpose of the present disclosure is to provide a transmitting power determination method and apparatus and a communication device, so as to solve the problem of the terminal transmitting power determination solution in the related art that the determined transmitting power is too low, which leads to a substantial degradation of sidelink communication quality and a decrease in sidelink communication throughput.

To solve the above-mentioned technical problem, an embodiment of the present disclosure provides a transmitting power determination method. The method is applied to a communication device and includes:

determining a comprehensive path loss according to a sidelink path loss of a first device, an uplink path loss of the first device, a first adjustment factor corresponding to the sidelink path loss and a second adjustment factor corresponding to the uplink path loss;

determining transmitting power of the first device according to a third adjustment factor and the comprehensive path loss.

Optionally, at most one adjustment factor among the first adjustment factor, the second adjustment factor, and third adjustment factor has a fixed value of 1.

Optionally, the sidelink path loss is the maximum value of at least two sidelink path losses of the first device.

Optionally, the uplink path loss is the minimum value of at least two uplink path losses of the first device.

Optionally, the determining the comprehensive path loss according to the sidelink path loss of the first device, the uplink path loss of the first device, the first adjustment factor corresponding to the sidelink path loss and the second adjustment factor corresponding to the uplink path loss includes:

determining the comprehensive path loss according to the sidelink path loss of the first device, the uplink path loss of the first device, the first adjustment factor corresponding to the sidelink path loss and the second adjustment factor corresponding to the uplink path loss by using a formula one;

wherein, the formula one is: $PL=\min(a \times PL_{SL}, b \times PL_{UL})$;

PL denotes the comprehensive path loss, a denotes the first adjustment factor, $PL_{SL}$ denotes the sidelink path loss, b denotes the second adjustment factor, and $PL_{UL}$ denotes the uplink path loss.

Optionally, the determining the transmitting power of the first device according to the third adjustment factor and the comprehensive path loss includes:

determining the transmitting power of the first device according to the third adjustment factor and the comprehensive path loss by using a formula two;

wherein, the formula two is: $P_{out}=\min(P_{max}, 10\log_{10}(BW)+P_0+c \times PL)$;

$P_{out}$ denotes the transmitting power of the first device, $P_{max}$ denotes maximum transmitting power of the first device, BW denotes a frequency bandwidth occupied by transmitting signal of the first device, $P_0$ denotes target receiving power corresponding to a pre-set sidelink communication quality, c denotes the third adjustment factor, and PL denotes the comprehensive path loss.

Optionally, the sidelink path loss is a path loss of a sidelink between the first device and a second device; and the uplink path loss is a path loss of an uplink air interface link between the first device and a third device.

Optionally, the first device and the second device are both terminals.

Optionally, the third device is a base station, and the base station includes a fourth generation (4G) base station (evolved node base station, eNB) or a fifth generation (5G) base station (next generation node base station, gNB).

An embodiment of the present disclosure further provides a communication device, including a memory, a processor and a program stored in the memory and configured to be executed by the processor, wherein, the processor implements the following steps when executing the program:

determining a comprehensive path loss according to a sidelink path loss of a first device, an uplink path loss of the first device, a first adjustment factor corresponding to the sidelink path loss and a second adjustment factor corresponding to the uplink path loss;

determining transmitting power of the first device according to a third adjustment factor and the comprehensive path loss.

Optionally, at most one adjustment factor among the first adjustment factor, the second adjustment factor, and third adjustment factor has a fixed value of 1.

Optionally, the sidelink path loss is the maximum value of at least two sidelink path losses of the first device.

Optionally, the uplink path loss is the minimum value of at least two uplink path losses of the first device.

Optionally, the processor is specifically used for:

determining the comprehensive path loss according to the sidelink path loss of the first device, the uplink path loss of the first device, the first adjustment factor corresponding to the sidelink path loss and the second adjustment factor corresponding to the uplink path loss by using a formula one;

wherein, the formula one is: $PL=\min(a \times PL_{SL}, b \times PL_{UL})$; PL denotes the comprehensive path loss, a denotes the first adjustment factor, $PL_{SL}$ denotes the sidelink path loss, b denotes the second adjustment factor, and $PL_{UL}$ denotes the uplink path loss.

Optionally, the processor is used for:

determining the transmitting power of the first device according to the third adjustment factor and the comprehensive path loss by using a formula two;

wherein, the formula two is: $P_{out}=\min(P_{max}, 10\log_{10}(BW)+P_0+c \times PL)$;

$P_{out}$ denotes the transmitting power of the first device, $P_{max}$ denotes maximum transmitting power of the first device, BW denotes a frequency bandwidth occupied by transmitting signal of the first device, $P_0$ denotes target receiving power corresponding to a pre-set sidelink communication quality, c denotes the third adjustment factor, and PL denotes the comprehensive path loss.

Optionally, the sidelink path loss is a path loss of a sidelink between the first device and a second device; and the uplink path loss is a path loss of an uplink air interface link between the first device and a third device.

Optionally, the first device and the second device are both terminals.

Optionally, the third device is a base station, and the base station includes a fourth generation (4G) base station (eNB) or a fifth generation (5G) base station (gNB).

An embodiment of the present disclosure further provides a computer-readable storage medium storing thereon a computer program, the computer program is configured to be executed by a processor to implement the steps of the foregoing transmitting power determination method.

An embodiment of the present disclosure further provides a transmitting power determination apparatus. The transmitting power determination apparatus is applied to a communication device and includes:

a first determination module, configured to determine a comprehensive path loss according to a sidelink path loss of a first device, an uplink path loss of the first device, a first adjustment factor corresponding to the sidelink path loss and a second adjustment factor corresponding to the uplink path loss;

a second determination module, configured to determine transmitting power of the first device according to a third adjustment factor and the comprehensive path loss.

Optionally, at most one adjustment factor among the first adjustment factor, the second adjustment factor, and third adjustment factor has a fixed value of 1.

Optionally, the sidelink path loss is the maximum value of at least two sidelink path losses of the first device.

Optionally, the uplink path loss is the minimum value of at least two uplink path losses of the first device.

Optionally, the first determination module includes:

a first determination sub-module, configured to determine the comprehensive path loss according to the sidelink path loss of the first device, the uplink path loss of the first device, the first adjustment factor corresponding to the sidelink path loss and the second adjustment factor corresponding to the uplink path loss by using a formula one;

wherein, the formula one is: $PL=\min(a \times PL_{SL}, b \times PL_{UL})$; PL denotes the comprehensive path loss, a denotes the first adjustment factor, $PL_{SL}$ denotes the sidelink path loss, b denotes the second adjustment factor, and $PL_{UL}$ denotes the uplink path loss.

Optionally, the second determination module includes:

a second determination sub-module, configured to determine the transmitting power of the first device according to the third adjustment factor and the comprehensive path loss by using a formula two;

wherein, the formula two is: $P_{out}=\min(P_{max}, 10\log_{10}(BW)+P_0+c \times PL)$;

$P_{out}$ denotes the transmitting power of the first device, $P_{max}$ denotes maximum transmitting power of the first device, BW denotes a frequency bandwidth occupied by transmitting signal of the first device, $P_0$ denotes target receiving power corresponding to a pre-set sidelink communication quality, c denotes the third adjustment factor, and PL denotes the comprehensive path loss.

Optionally, the sidelink path loss is a path loss of a sidelink between the first device and a second device; and the uplink path loss is a path loss of an uplink air interface link between the first device and a third device.

Optionally, the first device and the second device are both terminals.

Optionally, the third device is a base station, and the base station includes a fourth generation (4G) base station (eNB) or a fifth generation (5G) base station (gNB).

The beneficial effects of the above-mentioned technical solution of the present disclosure are as follows:

In the above-mentioned solution, the transmitting power determination method determines a comprehensive path loss according to the sidelink path loss and the uplink path loss of a first device, a first adjustment factor corresponding to the sidelink path loss and a second adjustment factor corresponding to the uplink path loss; determines transmitting power of the first device according to a third adjustment factor and the comprehensive path loss; such that the transmitting terminal (the first device) can use multiple adjustment factors to compensate for the sidelink path loss and the uplink path loss respectively, and then perform the sidelink transmitting power control according to the compensated comprehensive path loss, so as to meet the power control requirements in different scenarios and achieve better power control effects, thereby improving the data packet transmission success rate and throughput rate of sidelink communication, and reducing the sidelink communication latency at the same time; thus the problem of the terminal transmitting power determination solution in the related art that the determined transmitting power is too low, which leads to a substantial degradation of sidelink communication quality and a decrease in throughput, is solved.

BRIEF DESCRIPTION OF THE DRAWINGS

FIG. 1 is a schematic diagram of a sidelink and an uplink air interface link in the related art;

FIG. 2 is a flowchart of a transmitting power determination method according to an embodiment of the disclosure;

DETAILED DESCRIPTION

Figure 3:
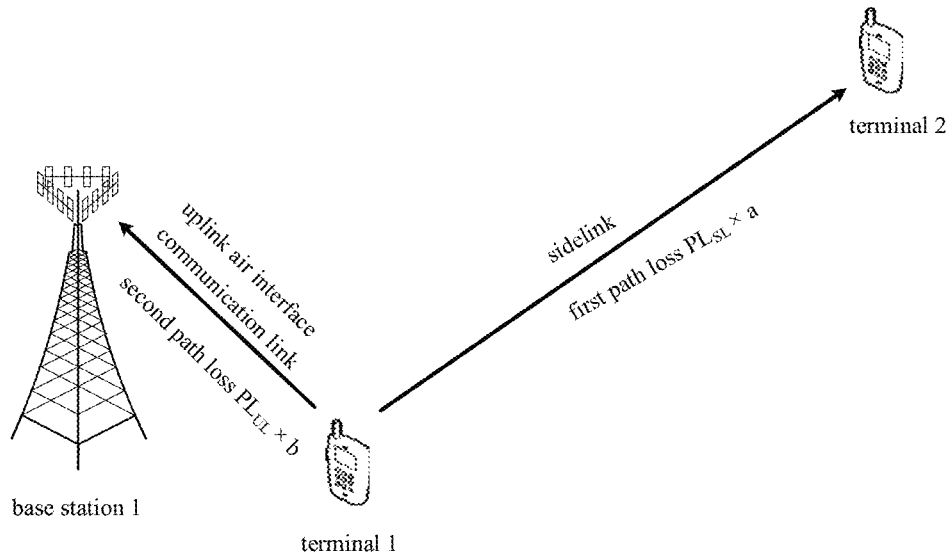
FIG. 3 is a schematic diagram showing power adjustment using three adjustment factors of a, b, c in a unicast scenario according to an embodiment of the disclosure.

In order to make the technical problem to be solved, the technical solutions and advantages of the present disclosure clearer, the present disclosure will be described in detail below with reference to the drawings and specific embodiments.

The present disclosure is directed to the problem of the terminal transmitting power determination solution in the related art that the determined transmitting power is too low, which leads to a substantial degradation of sidelink communication quality and a decrease in throughput, and provides a transmitting power determination method. The method is applied to a communication device and, as shown in FIG. 2, includes a step 21 and a step 22.

Step 21: determining a comprehensive path loss according to a sidelink path loss of a first device, an uplink path loss of the first device, a first adjustment factor corresponding to the sidelink path loss and a second adjustment factor corresponding to the uplink path loss.

Step 22: determining transmitting power of the first device according to a third adjustment factor and the comprehensive path loss.

The communication device includes a terminal and/or a base station.

The transmitting power determination method provided by the embodiment of the present disclosure determines a comprehensive path loss according to the sidelink path loss and uplink path loss of a first device, a first adjustment factor corresponding to the sidelink path loss and a second adjustment factor corresponding to the uplink path loss; determines transmitting power of the first device according to a third adjustment factor and the comprehensive path loss; such that the transmitting terminal (the first device) can use multiple adjustment factors to compensate for the sidelink path loss and the uplink path loss respectively, and then perform the sidelink transmitting power control according to the compensated comprehensive path loss, so as to meet the power control requirements in different scenarios and achieve better power control effects, thereby improving the data packet transmission success rate and throughput rate of sidelink communication, and reducing the sidelink communication latency at the same time; thus the problem of the terminal transmitting power determination solution in the related art that the determined transmitting power is too low, which leads to a substantial degradation of sidelink communication quality and a decrease in throughput, is solved.

In order to ensure the quality of the transmitting power adjustment of the first device, at most one adjustment factor among the first adjustment factor, the second adjustment factor, and the third adjustment factor has a fixed value of 1, and the values of the remaining adjustment factors can be determined according to the link communication quality requirement, but the present disclosure is not limited thereto.

For a multicast scenario, the sidelink path loss may be the maximum value of at least two sidelink path losses of the first device.

For a multi-connection scenario, the uplink path loss may be the minimum value of at least two uplink path losses of the first device.

In the embodiment of the present disclosure, the determining the comprehensive path loss according to the sidelink path loss of the first device, the uplink path loss of the first device, the first adjustment factor corresponding to the sidelink path loss and the second adjustment factor corresponding to the uplink path loss includes: determining the comprehensive path loss according to the sidelink path loss of the first device, the uplink path loss of the first device, the first adjustment factor corresponding to the sidelink path loss and the second adjustment factor corresponding to the uplink path loss by using a formula one; wherein, the formula one is: $PL = \min(a \times PL_{SL}, b \times PL_{UL})$; PL denotes the comprehensive path loss, a denotes the first adjustment factor, $PL_{SL}$ denotes the sidelink path loss, b denotes the second adjustment factor, and $PL_{UL}$ denotes the uplink path loss.

Specifically, the determining the transmitting power of the first device according to the third adjustment factor and the comprehensive path loss includes: determining the transmitting power of the first device according to the third adjustment factor and the comprehensive path loss by using a formula two; wherein, the formula two is: $P_{out} = \min(P_{max}, 10\log_{10}(BW) + P_0 + c \times PL)$; $P_{out}$ denotes the transmitting power of the first device, $P_{max}$ denotes maximum transmitting power of the first device, BW denotes a frequency bandwidth occupied by transmitting signal of the first device, $P_0$ denotes target receiving power corresponding to a pre-set sidelink communication quality, c denotes the third adjustment factor, and PL denotes the comprehensive path loss.

The sidelink path loss refers to a path loss of a sidelink between the first device and the second device; the uplink path loss refers to a path loss of an uplink air interface link (that is, uplink air interface communication link) between the first device and the third device.

Specifically, both the first device and the second device may be terminals; the third device may be a base station, and the base station may include a 4G base station (eNB) or a 5G base station (gNB), but the present disclosure is not limited thereto.

The first device may also be a device other than a terminal, such as a roadside unit (RSU).

The transmitting power determination method provided by the embodiment of the present disclosure will be further described below.

For the above technical problems, the embodiment of the present disclosure provides a transmitting power determination method, which can also be understood as a sidelink transmitting power control method. The solution provided by the embodiment of the present disclosure may mainly include: determining a first adjustment factor, a second adjustment factor, and a third adjustment factor; multiplying the first adjustment factor by the first path loss (sidelink path loss) of the first device to obtain the third path loss of the first device; multiplying the second adjustment factor by the second path loss (uplink path loss) of the first device to obtain the fourth path loss of the first device; obtaining the fifth path loss of the first device (that is, the above-mentioned comprehensive path loss) according to the third path loss and the fourth path loss; multiplying the third adjustment factor by the fifth path loss to obtain the sixth path loss of the first device; and calculating the transmitting power of the first device based on the sixth path loss.

Regarding the determination of the three factors: they can be determined according to the needs of specific scenarios. For example, in a scenario where the communication quality of the uplink is to be guaranteed, all three factors need to be small to reduce the interference to the uplink; in a scenario where the communication quality of the sidelink is to be guaranteed, all three factors need to be large. The three adjustment factors are all greater than 0, and the specific values are not limited.

Specifically, there may be following cases:
(1) All the three adjustment factors can be changed flexibly.
(2) The first adjustment factor is fixed at 1, and the second adjustment factor and the third adjustment factor can be changed flexibly.
(3) The second adjustment factor is fixed at 1, and the first adjustment factor and the third adjustment factor can be changed flexibly.
(4) The third adjustment factor is fixed at 1, and the first adjustment factor and the second adjustment factor can be changed flexibly.
(5) The first path loss refers to the path loss between the first device and the second device. The first device and the second device may both be terminals. More specifically, the first device may be a V2X transmitting device, and the second device may be a V2X receiving device.
(6) The first path loss refers to the maximum value of the path losses between the first device and n second devices, that is: $PL_{SL}=\max(PL_{SL1}, PL_{SL2}, PL_{SL3}, \ldots, PL_{SLn})$.

$PL_{SL}$ denotes the first path loss, $PL_{SL1}$ denotes the path loss between the first device and the first one of the second devices, $PL_{SL2}$ denotes the path loss between the first device and the second one of the second devices, $PL_{SL3}$ denotes the path loss between the first device and the third one of the second devices, and $PL_{SLn}$ denotes the path loss between the first device and the $n^{th}$ one of the second devices.

The n second devices may be different terminals, but the present disclosure is not limited thereto.

(7) The second path loss refers to the path loss between the first device and the third device. The first device may be a V2X transmitting device, and the third device may be a base station or a cell, and the base station may include a 4G base station (eNB) or a 5G base station (gNB).

(8) The second path loss refers to the minimum value of the path losses between the first device and m third devices, that is: $PL_{UL}=\min(PL_{UL1}, PL_{UL2}, PL_{UL3}, \ldots, PL_{ULm})$.

$PL_{UL}$ denotes the second path loss, $PL_{UL1}$ denotes the path loss between the first device and the first one of the third devices, $PL_{UL2}$ denotes the path loss between the first device and the second one of the third devices, $PL_{UL3}$ denotes the path loss between the first device and the third one of the third devices, and $PL_{ULm}$ denotes the path loss between the first device and the $m^{th}$ one of the third devices.

The m third devices may be different base stations, but the present disclosure is not limited thereto.

(9) The obtaining the fifth path loss of the first device according to the third path loss and the fourth path loss may specifically be: taking the minimum value of the third path loss and the fourth path loss as the fifth path loss.

(10) The transmitting power $P_{out}$ of the first device is obtained according to the following formula. The first adjustment factor refers to a; the second adjustment factor refers to b; the third adjustment factor refers to c; the first path loss refers to $PL_{SL}$; the second path loss refers to $PL_{UL}$; and the third path loss refers to $a \times PL_{SL}$; the fourth path loss refers to $b \lambda PL_{UL}$; the fifth path loss refers to PL; the sixth path loss refers to $c \times PL$:

$$PL=\min(a \times PL_{SL}, b \times PL_{UL});$$

$$P_{out}=\min(P_{max}, 10\log_{10}(BW)+P_0+c \times PL);$$

$P_{max}$ denotes the maximum transmitting power of the first device, BW denotes the frequency bandwidth occupied by the transmitting signal of the first device, and $P_0$ denotes the target receiving power corresponding to a pre-set sidelink communication quality.

It is noted, this solution can be used in the sidelink communication of the V2X system.

The solution provided by the embodiment of the present disclosure is described exemplarily. Terminal 1 is used as an example of the first device, terminal 2 is used as an example of the second device, and base station 1 is used as an example of the third device.

Example 1 (unicast scenario, assuming that the three adjustment factors a, b, and c all can be changed flexibly), as shown in FIG. 3:

In order to perform sidelink communication, terminal 1 must first determine its transmitting power on the sidelink, and the transmitting power is determined based on the path loss. The specific transmitting power determination method is: multiplying the sidelink path loss (that is, the first path loss) by a first adjustment factor a to obtain the third path loss $a \times PL_{SL}$, multiplying the uplink air interface communication link path loss (that is, the second path loss) by a second adjustment factor b to obtain the fourth path loss $b \times PL_{UL}$, and then obtaining the fifth path loss PL according to the method of taking the minimum value. The fifth path loss PL is multiplied by the third adjustment factor c to obtain the sixth path loss $c \times PL$. Then, the sidelink transmitting power of terminal 1 is calculated according to the sixth path loss. The formulas involved are as follows:

$$PL=\min(a \times PL_{SL}, b \times PL_{UL});$$

$$P_{out}=\min(P_{max}, 10\log_{10}(BW)+P_0+c \times PL);$$

$P_{max}$ denotes the maximum transmitting power of the first device, BW denotes the frequency bandwidth occupied by the transmitting signal of the first device, and $P_0$ denotes the target receiving power corresponding to a pre-set sidelink communication quality;

$P_0$ can be an empirical value, a pre-set value, and specifically can be −100 dBm, −90 dBm, etc.

The solution of this example simultaneously uses three (path loss weight) adjustment factors a, b, and c for transmitting power control, which can realize the path loss weight adjustment of the sidelink, the uplink air interface communication link, and the comprehensive communication link independently, which makes the power control effect better.

Further, in a unicast scenario, any one of the three adjustment factors a, b, and c can be fixed to 1, and the remaining adjustment factors can be changed flexibly. The specific implementation process is similar to the situation where the three adjustment factors a, b, and c can be changed flexibly. Specifically:

in the situation where c is fixed at 1, the formulas involved are: $PL=\min(a \times PL_K, b \times PL_{UL})$;

$P_{out}=\min(P_{max}, 10\log_{10}(BW)+P_0+PL)$;

in the situation where b is fixed at 1, the formulas involved are: $PL=\min(a \times PL_{SL}, PL_{UL})$;

$P_{out}=\min(P_{max}, 10\log_{10}(BW)+P_0+c \times PL)$;

in the situation where a is fixed at 1, the formulas involved are: $PL=\min(PL_{SL}, b \times PL_{UL})$;

$P_{out}=\min(P_{max}, 10\log_{10}(BW)+P_0+c \times PL)$;

the meanings of the parameters are the same as above, which are not repeated here.

Regarding the solution of controlling transmitting power by using two flexibly changeable (path loss weight) adjustment factors, it is possible to independently adjust the path loss weight of the sidelink and the path loss weight of the uplink air interface communication link, and at the same time signalling overhead is small.

Figure 4:
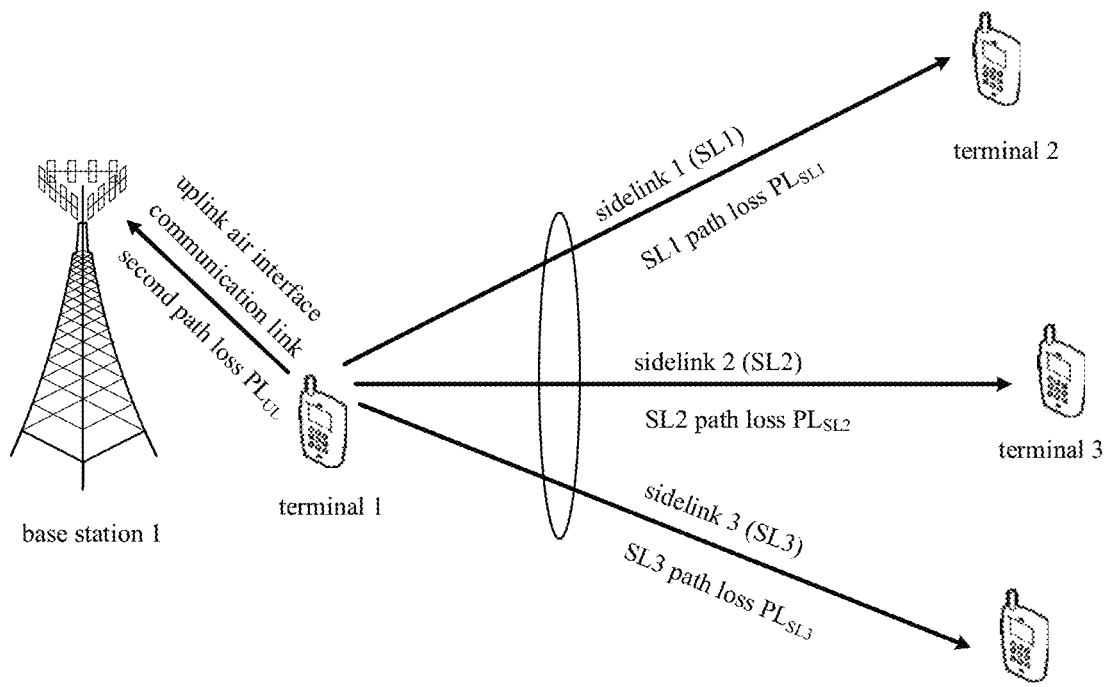
FIG. 4 is a schematic diagram of determining a first path loss in a multicast scenario according to an embodiment of the disclosure.

Example 2 (multicast scenario, assuming that all the three adjustment factors a, b, and c can be changed flexibly, and there are n sidelinks), as shown in FIG. 4:

In order to perform sidelink communication in the multicast scenario, terminal 1 must first determine its transmitting power on the sidelink, and the transmitting power is determined based on the path loss. The specific transmitting power determination method is as follows:

First, the first path loss $PL_{SL}$ needs to be determined according to the path losses of the n sidelinks. The determination method is based on the rule: the first path loss refers to the maximum value of the path losses between the first device and the n second devices, that is: $PL_{SL}=\max(PL_{SL1}, PL_{SL2}, PL_{SL3}, \ldots, PL_{SLn})$. In this example, terminal 1, terminal 2, and terminal 3 are used as examples of the n second devices.

Next, the sidelink path loss (i.e., the first path loss) is multiplied by one first adjustment factor a to obtain the third path loss $a \times PL_{SL}$, and the uplink air interface communication link path loss (i.e., the second path loss) is multiplied by one second adjustment factor b to obtain the fourth path loss $b \times PL_{UL}$, and then the fifth path loss PL is obtained according to the method of taking the minimum value. The fifth path loss PL is multiplied by the third adjustment factor c to obtain the sixth path loss $c \times PL$. Then the sidelink transmitting power of the terminal 1 is calculated according to the sixth path loss. The formulas involved are as follows:

$PL=\min(a \times PL_{SL}, b \times PL_{UL})$;

$P_{out}=\min(P_{max}, 10\log_{10}(BW)+P_0+c \times PL)$;

$P_{max}$ denotes the maximum transmitting power of the first device, BW denotes the frequency bandwidth occupied by the transmitting signal of the first device, and $P_0$ denotes the target receiving power corresponding to the pre-set sidelink communication quality;

$P_0$ can be an empirical value, a pre-set value, and specifically can be −100 dBm, −90 dBm, etc.

The solution of this example simultaneously uses three path loss weight adjustment factors a, b, and c for transmitting power control, and can adjust the path loss weight of the sidelink, the path loss weight of the uplink air interface communication link, and the path loss weight of the comprehensive communication link independently. In addition, the first path loss is the maximum value of all sidelink path losses, thus the sidelink receiving requirements of the terminal furthest from the first device are met, and the power control effect is relatively good.

Figure 5:
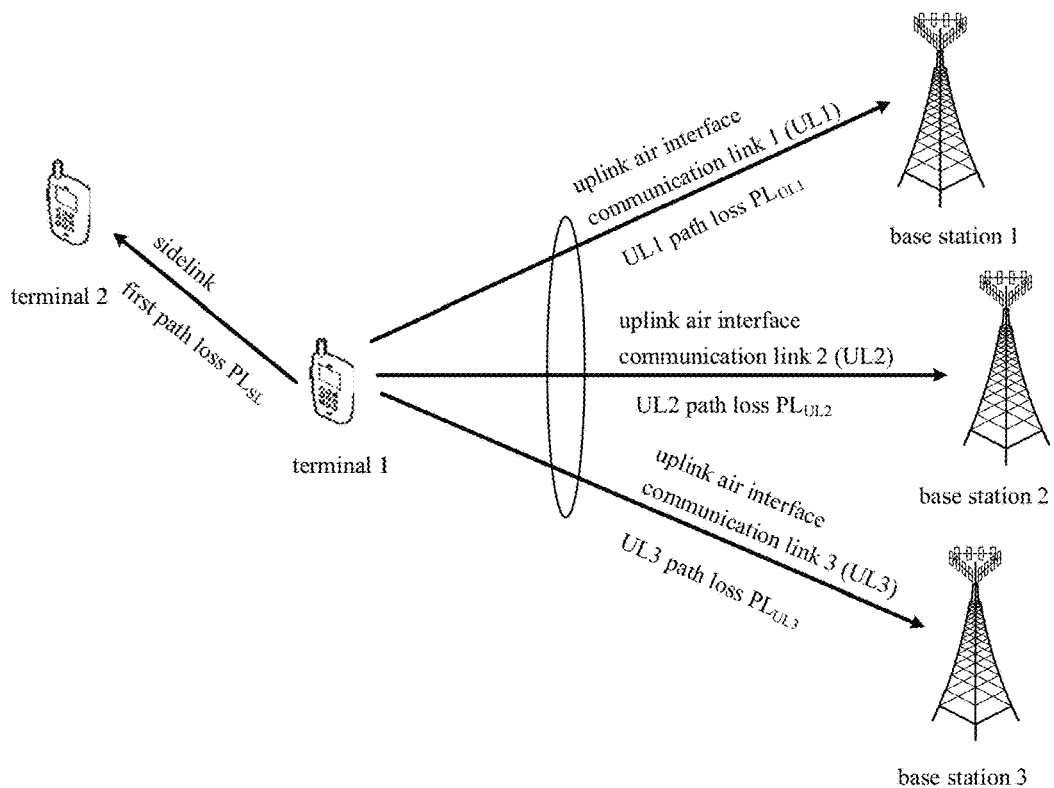
FIG. 5 is a schematic diagram of determining a second path loss in a multi-connection scenario according to an embodiment of the disclosure.

Example 3 (multi-connection scenario, assuming that all the three adjustment factors a, b, and c can be changed flexibly), as shown in FIG. 5:

In order to perform sidelink communication, terminal 1 must first determine its transmitting power on the sidelink, and the transmitting power is determined based on the path loss. The specific transmitting power determination method is as follows:

First, the second path loss $PL_{UL}$ needs to be determined according to the path losses of m uplink air interface communication links. The determination method is: the second path loss refers to the minimum value of the path losses between the first device and the m third devices, that is: $PL_{UL}=\min(PL_{UL1}, PL_{UL2}, PL_{UL3}, \ldots, PL_{ULm})$. In this example, base station 1, base station 2, and base station 3 are used as examples of the m third devices.

Next, the sidelink path loss (i.e., the first path loss) is multiplied by one first adjustment factor a to obtain the third path loss $a \times PL_{SL}$, and the uplink air interface communication link path loss (i.e., the second path loss) is multiplied by one second adjustment factor b to obtain the fourth path loss $b \times PL_{UL}$, and then the fifth path loss PL is obtained according to the method of taking the minimum value. The fifth path loss PL is multiplied by the third adjustment factor c to obtain the sixth path loss $c \times PL$. Then the sidelink transmitting power of the terminal 1 is calculated according to the sixth path loss. The formulas involved are as follows:

$PL=\min(a \times PL_{SL}, b \times PL_{UL})$;

$P_{out}=\min(P_{max}, 10\log_{10}(BW)+P_0+c \times PL)$;

$P_{max}$ denotes the maximum transmitting power of the first device, BW denotes the frequency bandwidth occupied by the transmitting signal of the first device, and $P_0$ denotes the target receiving power corresponding to the pre-set sidelink communication quality;

$P_0$ can be an empirical value, a pre-set value, and specifically can be −100 dBm, −90 dBm, etc.

The solution of this example simultaneously uses three path loss weight adjustment factors a, b, and c for transmitting power control, and can adjust the path loss weight of the sidelink, the path loss weight of the uplink air interface communication link, and the path loss weight of the comprehensive communication link independently. In addition, the second path loss is the minimum value of all uplink air interface communication link path losses, thus the interference avoidance requirement of the base station closest to the first device is met, and the power control effect is relatively good.

It is noted that the multicast scenario and the multi-connection scenario may co-exist. For the specific implementation, reference may be made to the above example, which will not be described again.

Further, the control of the transmitting power can specifically include: determining the smaller one among $b \times PL_{UL}$ and $a \times PL_{SL}$; if $a \times PL_{SL}$ is smaller, in the case that the transmitting power needs to be increased, the factor a can be adjusted larger, to increase the transmitting power of the sidelink (SL) and reduce the BLER of the SL; in the case that the transmitting power needs to be reduced, the factor a can be adjusted smaller to reduce the interference to the uplink air interface;

if $b \times PL_{UL}$ is smaller (as shown in FIG. 3), then in the case that the transmitting power needs to be increased, the factor b can be adjusted larger, to increase the transmitting power of the sidelink (SL) and reduce the BLER of the SL; in the case that the transmitting power needs to be reduced, the factor a can be adjusted smaller, to reduce the interference to the uplink air interface; but the present disclosure is not limited thereto.

In addition, if the above adjustment still does not achieve the desired effect, the factor c can also be adjusted directly. In the case that the transmitting power needs to be increased, the factor c can be adjusted larger, to increase the transmitting power of the sidelink (SL) and reduce the BLER of the SL; in the case that the transmitting power needs to be reduced, the factor a can be adjusted smaller, to reduce the interference to the uplink air interface; but the present disclosure is not limited thereto.

As can be seen from the above, in the solution provided by the embodiments of the present disclosure, compared with the related art, the transmitting terminal can use multiple adjustment factors to compensate for the sidelink path loss and the uplink air interface path loss respectively, and then perform the sidelink transmitting power control according to the compensated comprehensive path loss, so as to meet the power control requirements in different scenarios (for example, a scenario where the communication quality of the uplink is to be guaranteed, and a scenario where the communication quality of the sidelink is to be guaranteed) and achieve better power control effects, thereby improving the data packet transmission success rate and throughput rate of sidelink communication, and reducing the sidelink communication latency at the same time.

Figure 6:
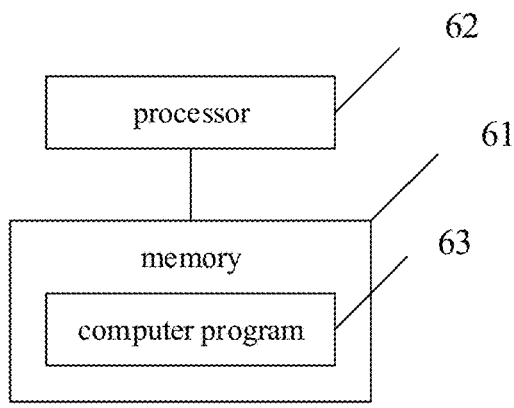
FIG. 6 is a schematic structural diagram of a communication device according to an embodiment of the disclosure.

An embodiment of the present disclosure also provides a communication device. As shown in FIG. 6, the communication device includes a memory 61, a processor 62, and a computer program 63 stored in the memory 61 and configured to be executed by the processor 62; when the processor 62 executes the program, the following steps are implemented:

determining a comprehensive path loss according to a sidelink path loss of a first device, an uplink path loss of the first device, a first adjustment factor corresponding to the sidelink path loss and a second adjustment factor corresponding to the uplink path loss;

determining transmitting power of the first device according to a third adjustment factor and the comprehensive path loss.

The communication device in the embodiment of the present disclosure may also include a component such as a transceiver, where is not limited herein.

The communication device provided by the embodiment of the present disclosure determines the comprehensive path loss according to the sidelink path loss of the first device, the uplink path loss of the first device, a first adjustment factor corresponding to the sidelink path loss and a second adjustment factor corresponding to the uplink path loss; determines transmitting power of the first device according to a third adjustment factor and the comprehensive path loss; such that the transmitting terminal (the first device) can use multiple adjustment factors to compensate for the sidelink path loss and the uplink path loss respectively, and then perform the sidelink transmitting power control according to the compensated comprehensive path loss, so as to meet the power control requirements in different scenarios and achieve better power control effects, thereby improving the data packet transmission success rate and throughput rate of sidelink communication, and reducing the sidelink communication latency at the same time; thus the problem of the terminal transmitting power determination solution in the related art that the determined transmitting power is too low, which leads to a substantial degradation of sidelink communication quality and a decrease in throughput, is solved.

In order to ensure the quality of the transmitting power adjustment of the first device, at most one adjustment factor among the first adjustment factor, the second adjustment factor, and the third adjustment factor has a fixed value of 1.

For a multicast scenario, the sidelink path loss is the maximum value of at least two sidelink path losses of the first device.

For a multi-connection scenario, the uplink path loss is the minimum value of at least two uplink path losses of the first device.

In the embodiment of the present disclosure, the processor is specifically used for: determining the comprehensive path loss according to the sidelink path loss of the first device, the uplink path loss of the first device, the first adjustment factor corresponding to the sidelink path loss and the second adjustment factor corresponding to the uplink path loss by using a formula one; wherein, the formula one is: $PL = \min(a \times PL_{SL}, b \times PL_{UL})$; PL denotes the comprehensive path loss, a denotes the first adjustment factor, $PL_{SL}$ denotes the sidelink path loss, b denotes the second adjustment factor, and $PL_{UL}$ denotes the uplink path loss.

Specifically, the processor is used for: determining the transmitting power of the first device according to the third adjustment factor and the comprehensive path loss by using a formula two; wherein, the formula two is: $P_{out} = \min(P_{max}, 10 \log_{10}(BW) + P_0 + c \times PL)$; $P_{out}$ denotes the transmitting power of the first device, $P_{max}$ denotes the maximum transmitting power of the first device, BW denotes a frequency bandwidth occupied by the transmitting signal of the first device, $P_0$ denotes target receiving power corresponding to a pre-set sidelink communication quality, c denotes the third adjustment factor, and PL denotes the comprehensive path loss.

The sidelink path loss refers to a path loss of a sidelink between the first device and the second device; the uplink path loss refers to a path loss of an uplink air interface link between the first device and the third device.

Specifically, the first device and the second device are both terminals; the third device is a base station, and the base station includes a 4G base station (eNB) or a 5G base station (gNB).

The implementations of the foregoing transmitting power determination method are all applicable to the embodiments of the communication device, and the same technical effect can also be achieved.

An embodiment of the present disclosure further provides a computer-readable storage medium storing thereon a computer program, the computer program is configured to be executed by a processor to implement the steps of the foregoing transmitting power determination method.

The implementations of the foregoing transmitting power determination method are all applicable to embodiments of the computer-readable storage medium, and the same technical effect can also be achieved.

Figure 7:
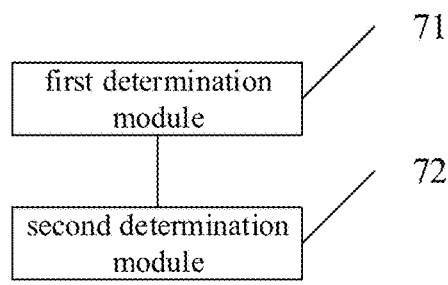
FIG. 7 is a schematic structural diagram of a transmitting power determination apparatus according to an embodiment of the disclosure.

An embodiment of the present disclosure further provides a transmitting power determination apparatus. The apparatus is applied to a communication device, and, as shown in FIG. 7, includes:

- a first determination module 71, configured to determine a comprehensive path loss according to a sidelink path loss of a first device, an uplink path loss of the first device, a first adjustment factor corresponding to the sidelink path loss and a second adjustment factor corresponding to the uplink path loss;
- a second determination module 72, configured to determine transmitting power of the first device according to a third adjustment factor and the comprehensive path loss.

The transmitting power determination apparatus provided by the embodiment of the present disclosure determines the comprehensive path loss according to the sidelink path loss and the uplink path loss of a first device, a first adjustment factor corresponding to the sidelink path loss and a second adjustment factor corresponding to the uplink path loss; determines transmitting power of the first device according to a third adjustment factor and the comprehensive path loss; such that the transmitting terminal (the first device) can use multiple adjustment factors to compensate for the sidelink path loss and the uplink path loss respectively, and then perform the sidelink transmitting power control according to the compensated comprehensive path loss, so as to meet the power control requirements in different scenarios and achieve better power control effects, thereby improving the data packet transmission success rate and throughput rate of sidelink communication, and reducing the sidelink communication latency at the same time; thus the problem of the terminal transmitting power determination solution in the related art that the determined transmitting power is too low, which leads to a substantial degradation of sidelink communication quality and a decrease in throughput, is solved.

In order to ensure the quality of the transmitting power adjustment of the first device, at most one adjustment factor among the first adjustment factor, the second adjustment factor, and the third adjustment factor has a fixed value of 1.

For a multicast scenario, the sidelink path loss is the maximum value of at least two sidelink path losses of the first device.

For a multi-connection scenario, the uplink path loss is the minimum value of at least two uplink path losses of the first device.

In the embodiment of the present disclosure, the first determination module includes: a first determination sub-module, configured to determine the comprehensive path loss according to the sidelink path loss of the first device, the uplink path loss of the first device, the first adjustment factor corresponding to the sidelink path loss and the second adjustment factor corresponding to the uplink path loss by using a formula one; wherein, the formula one is: $PL=\min(a \times PL_{SL}, b \times PL_{UL})$; PL denotes the comprehensive path loss, a denotes the first adjustment factor, $PL_{SL}$ denotes the sidelink path loss, b denotes the second adjustment factor, and $PL_{UL}$ denotes the uplink path loss.

Specifically, the second determination module includes: a second determination sub-module, configured to determine the transmitting power of the first device according to the third adjustment factor and the comprehensive path loss by using a formula two; wherein, the formula two is: $P_{out}=\min(P_{max}, 10\log_{10}(BW)+P_0+c \times PL)$; $P_{out}$ denotes the transmitting power of the first device, $P_{max}$ denotes maximum transmitting power of the first device, BW denotes a frequency bandwidth occupied by transmitting signal of the first device, $P_0$ denotes target receiving power corresponding to a pre-set sidelink communication quality, c denotes the third adjustment factor, and PL denotes the comprehensive path loss.

The sidelink path loss refers to a path loss of a sidelink between the first device and the second device; the uplink path loss refers to a path loss of an uplink air interface link between the first device and the third device.

Specifically, the first device and the second device are both terminals; the third device is a base station, and the base station includes a 4G base station (eNB) or a 5G base station (gNB).

The implementations of the foregoing transmitting power determination method are all applicable to embodiments of the transmitting power determination apparatus, and the same technical effect can also be achieved.

A person of ordinary skill in the art may realize that the units and algorithm steps described in the embodiments disclosed herein can be implemented by electronic hardware or a combination of computer software and electronic hardware. Whether these functions are executed by hardware or software depends on the specific application and design constraint conditions of the technical solution. A person skilled in the art can use different methods for each specific application to implement the described functions, but such implementation should not be considered as going beyond the scope of the present disclosure.

A person skilled in the art can clearly understand that, for the convenience and conciseness of the description, for the specific working process of the system, apparatus, and unit described above, references may be made to the corresponding process in the foregoing method embodiments, which is not repeated here.

In the embodiments provided in the present disclosure, it should be understood that the disclosed apparatus and method may be implemented in other ways. For example, the apparatus embodiments described above are only illustrative, for example, the division of the units is only a logical function division, and there may be other type of divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, apparatuses, or units, and maybe in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium.

Based on such understanding, essential parts, or parts contributing to the related art, of the technical solution of the present disclosure may be implemented in form of a software product. The computer software product is stored in a storage medium and includes several instructions to make a computer device (which may be a personal computer, a server, or a network device, etc.) to execute all or part of the steps of the methods described in the various embodiments of the present disclosure. The aforementioned storage medium includes: a USB disk, a removable hard disk, a read-only memory (ROM), a random access memory (RAM), a magnetic disk, an optical disc, and other medium which can store program codes.

A person of ordinary skill in the art can understand that all or part of the processes in the above-mentioned embodiment methods can be implemented by controlling the relevant hardware through a computer program. The program can be stored in a computer readable storage medium. When executed, the program may include the procedures of the above-mentioned method embodiments. The storage medium may be a magnetic disk, an optical disc, a read-only memory (ROM), or a random access memory (RAM), etc.

It can be understood that the embodiments described in the present disclosure may be implemented by hardware, software, firmware, middleware, microcode, or a combination thereof. For a hardware implementation, the module, unit, and sub-unit can be implemented in one or more application-specific integrated circuits (ASIC), digital signal processors (DSP), digital signal processing devices (DSP Device, DSPD), programmable logic devices (PLD), Field-Programmable Gate Arrays (FPGA), general-purpose processors, controllers, microcontrollers, microprocessors, other electronic units for performing the functions described in this disclosure or a combination thereof.

For a software implementation, the technique described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

It should be noted that many functional components described in this description are referred to as modules/sub-modules, in order to particularly emphasize the independence of their implementations.

In the embodiments of the present disclosure, the modules/sub-modules may be implemented by software, so as to be executed by various types of processors. For example, an identified executable code module may include one or more physical or logical blocks of computer instructions, for example, it may be built as an object, process, or function. Nevertheless, the executable codes of the identified module does not need to be physically located together, but can include different instructions stored in different locations. When these instructions are logically combined together, they constitute a module and achieve the specified purpose of the module.

In fact, the executable code module can be a single piece of instruction or many pieces of instructions, and even may be distributed on multiple different code segments, distributed in different programs, and distributed across multiple storage devices. Likewise, operational data can be identified within the module, and can be implemented in any suitable form and organized in any suitable type of data structure. The operating data may be collected as a single data set, or may be distributed in different locations (e.g., on different storage devices), and may at least partly exist as an electronic signal in a system or a network.

In the case that a module may be implemented in software, considering the hardware process level in the related art, a person skilled in the art may construct hardware corresponding to all modules that can be implemented in software, to achieve corresponding functions, if cost is not considered. The hardware circuit includes normal very large scale integration (VLSI) circuit or gate array, and semiconductor devices in the relate art such as logic chip or transistor, or other discrete devices. The module may also be implemented with a programmable hardware device, such as field program gate array, programmable logic array or programmable logic device.

The above are optional implementations of the present disclosure. It should be pointed out that for a person skilled in the art, several improvements and modifications can be made without departing from the principles of the present disclosure. These improvements and modifications should also fall within the scope of the present disclosure.

What is claimed is:

1. A transmitting power determination method, applied to a communication device, comprising:
determining a comprehensive path loss according to a sidelink path loss of a first device, an uplink path loss of the first device, a first adjustment factor corresponding to the sidelink path loss and a second adjustment factor corresponding to the uplink path loss;
determining transmitting power of the first device according to a third adjustment factor and the comprehensive path loss;
wherein at most one adjustment factor among the first adjustment factor, the second adjustment factor, and third adjustment factor has a fixed value of 1.

2. The transmitting power determination method according to claim 1, wherein the sidelink path loss is a maximum value of at least two sidelink path losses of the first device.

3. The transmitting power determination method according to claim 1, wherein the uplink path loss is a minimum value of at least two uplink path losses of the first device.

4. The transmitting power determination method according to claim 1, wherein the determining the comprehensive path loss according to the sidelink path loss of the first device, the uplink path loss of the first device, the first adjustment factor corresponding to the sidelink path loss and the second adjustment factor corresponding to the uplink path loss comprises:
determining the comprehensive path loss according to the sidelink path loss of the first device, the uplink path loss of the first device, the first adjustment factor corresponding to the sidelink path loss and the second adjustment factor corresponding to the uplink path loss by using a formula one;
wherein, the formula one is: $PL = \min(a \times PLSL, b \times PLUL)$;
PL denotes the comprehensive path loss, a denotes the first adjustment factor, PLSL denotes the sidelink path loss, b denotes the second adjustment factor, and PLUL denotes the uplink path loss.

5. The transmitting power determination method according to claim 4, wherein the determining the transmitting power of the first device according to the third adjustment factor and the comprehensive path loss comprises:
determining the transmitting power of the first device according to the third adjustment factor and the comprehensive path loss by using a formula two;
wherein, the formula two is: $Pout = \min(Pmax, 10 \log 10(BW) + P0 + c \times PL)$;

Pout denotes the transmitting power of the first device, Pmax denotes maximum transmitting power of the first device, BW denotes a frequency bandwidth occupied by transmitting signal of the first device, P0 denotes target receiving power corresponding to a pre-set sidelink communication quality, c denotes the third adjustment factor, and PL denotes the comprehensive path loss.

6. The transmitting power determination method according to claim 1, wherein the sidelink path loss is a path loss of a sidelink between the first device and a second device; and the uplink path loss is a path loss of an uplink air interface link between the first device and a third device.

7. The transmitting power determination method according to claim 6, wherein the first device and the second device are both terminals.

8. The transmitting power determination method according to claim 6, wherein the third device is a base station, and the base station comprises a fourth generation (4G) base station (eNB) or a fifth generation (5G) base station (gNB).

9. A communication device, comprising a memory, a processor and a computer program stored in the memory and configured to be executed by the processor, wherein the processor implements following steps when executing the computer program:
  determining a comprehensive path loss according to a sidelink path loss of a first device, an uplink path loss of the first device, a first adjustment factor corresponding to the sidelink path loss and a second adjustment factor corresponding to the uplink path loss;
  determining transmitting power of the first device according to a third adjustment factor and the comprehensive path loss;
  wherein at most one adjustment factor among the first adjustment factor, the second adjustment factor, and third adjustment factor has a fixed value of 1.

10. The communication device according to claim 9, wherein the sidelink path loss is a maximum value of at least two sidelink path losses of the first device.

11. The communication device according to claim 9, wherein the uplink path loss is a minimum value of at least two uplink path losses of the first device.

12. The communication device according to claim 9, wherein the processor is specifically used for:
  determining the comprehensive path loss according to the sidelink path loss of the first device, the uplink path loss of the first device, the first adjustment factor corresponding to the sidelink path loss and the second adjustment factor corresponding to the uplink path loss by using a formula one;
  wherein, the formula one is: $PL = \min(a \times PLSL, b \times PLUL)$;
  PL denotes the comprehensive path loss, a denotes the first adjustment factor, PLSL denotes the sidelink path loss, b denotes the second adjustment factor, and PLUL denotes the uplink path loss.

13. The communication device according to claim 12, wherein the processor is specifically used for:
  determining the transmitting power of the first device according to the third adjustment factor and the comprehensive path loss by using a formula two;
  wherein, the formula two is: $Pout = \min(Pmax, 10 \log 10(BW) + P0 + c \times PL)$;
  Pout denotes the transmitting power of the first device, Pmax denotes maximum transmitting power of the first device, BW denotes a frequency bandwidth occupied by transmitting signal of the first device, P0 denotes target receiving power corresponding to a pre-set sidelink communication quality, c denotes the third adjustment factor, and PL denotes the comprehensive path loss.

14. The communication device according to claim 9, wherein the sidelink path loss is a path loss of a sidelink between the first device and a second device; and the uplink path loss is a path loss of an uplink air interface link between the first device and a third device.

15. The communication device according to claim 14, wherein the first device and the second device are both terminals.

16. The communication device according to claim 14, wherein the third device is a base station, and the base station comprises a fourth generation (4G) base station (eNB) or a fifth generation (5G) base station (gNB).

17. A non-transitory computer-readable storage medium storing thereon a computer program, wherein the computer program is configured to be executed by a processor to implement the steps of the transmitting power determination method according to claim 1.

* * * * *